United States Patent [19]

Suzuki et al.

[11] Patent Number: 4,509,104

[45] Date of Patent: Apr. 2, 1985

[54] HIGH TEMPERATURE RESISTANT LIGHTING DEVICE

[75] Inventors: Koichi Suzuki, Suita; Seiroku Oose, Higashiosaka; Yuzo So, Ashiya; Yasutaka Hirao, Munakata, all of Japan

[73] Assignee: Dainichi-Nippon Cables, Ltd., Amagasaki, Japan

[21] Appl. No.: 486,343

[22] Filed: Apr. 19, 1983

[30] Foreign Application Priority Data

| Apr. 27, 1982 [JP] | Japan | 57-62997[U] |
| Dec. 28, 1982 [JP] | Japan | 57-202129[U] |
| Dec. 28, 1982 [JP] | Japan | 57-202130[U] |

[51] Int. Cl.$^3$ .............................................. F21V 7/04
[52] U.S. Cl. ..................... 362/32; 362/264; 362/294
[58] Field of Search ............... 362/32, 96, 101, 263, 362/264, 267, 294, 282, 345, 373, 804

[56] References Cited

U.S. PATENT DOCUMENTS

4,205,366  5/1980  Bleiweiss ........................ 362/294
4,363,080  12/1982  Sylvester ........................ 362/32

Primary Examiner—Donald P. Walsh
Attorney, Agent, or Firm—W. G. Fasse; D. H. Kane, Jr.

[57] ABSTRACT

This invention is directed to a high temperature resistant lighting device for lighting the interior of a high temperature furnace for observing the furnace interior from the outside. A lighting lamp (5) and an inspection device (9) are housed within a metallic heat protective casing (10) having a cooling path (27) for circulation of cooling water. The lamp and an objective section (91) of the inspection device are rotatable with its associated drives (53) and (97) so that the illuminating direction of light from the lamp and the viewing direction of the objective section are variable so as to direct illuminating light beams from the lamp toward a wall surface of the furnace via a viewing window (4) and focus reflected light beams from the wall surface of the furnace onto the objective section. The light beams focused on the objective section are led out of the furnace through an optical fiber bundle or cable (92) and picked up to form a video image of the wall surface of the furnace by means of a TV camera (17). Accurate and scrupulous observation of the inner wall surface of the furnace is made possible by varying the directions of the lamp and the objective section.

10 Claims, 10 Drawing Figures

HIGH TEMPERATURE RESISTANT LIGHTING DEVICE

BACKGROUND OF THE INVENTION

1. Field of the Invention

This invention relates to a high temperature resistant lighting device. More particularly, the present invention relates to a high temperature resistant lighting device adapted for lighting a wall surface of a high temperature furnace working at more than about 500° C. or more than about 1000° C.

2. Description of the Prior Art

Due to safety requirements in high temperature furnaces or the like for use in iron mills, for example, it is necessary to regularly monitor the state of an inner wall of the high temperature furnace at work and check if an abnormal condition such as a damaged surface happens to be present in the inner wall. If it would be necessary that the high temperature furnace is cooled down to room temperature prior to monitoring the inner wall of the furnace, the operation rate of the furnace would be very poor. It is therefore desirable to carry out a checkup of the inner wall of the furnace under the condition where the interior of the furnace in operation is maintained at a high temperature. To observe the interior of the high temperature furnace, there are required a light source having a color temperature higher than a color temperature equivalent to the internal temperature of the furnace to lighten the wall surface of the furnace at an intensity of illumination higher than the brightness of the wall surface of the furnace and a TV camera or other means for observing the state of the wall surface. One of the lighting devices which meets the above requirement is a lighting device using a light guide or that using a floodlamp.

The light guide generally comprises a bundle of optical fibers which are disposed to extend into a metallic protective casing for introduction of light beams from a light source. The light source which emits light into one end of the light guide is typically a tungsten halogen lamp. Since a typical example of the light guide is a bundle of three hundred optical fibers having an outer diameter of about 100 μm, it is practically impossible to lighten clearly the wall surface of the furnace because of a deteriorated efficiency of incident light running from the light source to the runs of the fibers and an insufficient amount of outgoing light results. To improve the input efficiency of light from the light source to the fibers, increasing the cross sectional area of the light guide has not been effective. In the event that a light guide with a sufficient efficiency of incident light is made practically possible to manufacture, a compact lighting device is not easily available because the light guide itself is bulky and voluminous.

The lighting device relying upon a floodlamp, on the other hand, is adapted for use of a xenon lamp, for example, to floodlight directly the wall surface of the furnace working at high temperatures with light beams from the lamp, without the light guide having trouble enriching the efficiency of incident light from the light source. A TV camera or other means of inspecting to pick up reflected light beams from the wall surface is used with the xenon flood lamp for inspecting purposes. Though the floodlamp type lighting device has no problem of efficiency of incident light from the light source as experienced with the light guide, it faces another problem difficult from a heat-proof point of view because it is difficult to place the light source into the high temperature atmosphere of the furnace. Hence, a separate path is required in the furnace for light traveling from the light source to the wall surface of the furnace. To lighten a plurality of desired points in the furnace, a plurality of light paths as mentioned above are needed in the furnace. This requirement makes observation of the desired points on the inner wall of the furnace practically impossible.

SUMMARY OF THE INVENTION

Accordingly, it is a primary object of the present invention to provide a high temperature resistant lighting device which illuminates desired points of the inner wall in a high temperature furnace under a high temperature atmosphere with sufficient efficiency and brightness.

It is another object of the present invention to provide a high temperature resistant lighting device which illuminates desired points in a high temperature furnace with a compact structure.

The present invention provides a lighting device which comprises a metal-made protective casing and a light source. The metallic protective casing includes a space and a window made of a glass member is located at a suitable position on the casing. A cooling path is defined along a wall of the space of the metallic protective casing, except over the window, for circulation of a suitable cooling medium such as water. A light source is housed within the space for illuminating an object by way of the viewing window.

The present inventin provides the ability of a floodlight with a very high intensity of illuminating positions sought to be observed even in a high temperature surrounding atmosphere. In constrast with the conventional lighting device relying upon a light guide, the present invention eliminates the need for the lighting fiber and assures compactness of the overall device.

In a preferred embodiment of the present invention, an inspecting device is located in a space of a metallic protective casing. An objective section of the inspecting device focuses light reflected from a viewing object via the viewing window. The reflection light from the object as focused by the objective section is led to an optical fiber bundle for imaging by means of a TV camera.

In this embodiment, the inspecting means permits to observe an image of the object with a high intensity of illuminating light from the light source, thus making it easy to observe points in high temperature furnaces or reactors where an observation is very difficult due to a remarkably high surrounding temperature, or due to radioactive radiation.

In another embodiment of the present invention, either the light source or the objective section is rotated with a variable angle of its orientation toward the object.

Since in this altenative embodiment the illuminating direction of the light source is variable relative to the viewing direction of the objective section, this embodiment permits highly accurate and scrupulous observation of the object even in positions thereof where an observation is extremely difficult.

In still another preferred embodiment of the present invention, the interior of the casing is cooled and dust or other foreign substances around the viewing window or the object are removed to assure an improved precise observation of the object, by introducing air or other gas into the space of the metallic protective casing and ejecting such air or gas from the neighborhood of the viewing window.

In another embodiment of the present invention, the reflected light from the object as focused by the objective section, is led to one end of an optical fiber bundle which is an integral unit of a plurality of runs of silica glass fibers molten together and the image from the object is displayed on a TV screen by an imaging means disposed at the other end of the optical fiber. Since in this case the runs of the silica glass fibers are integrally molten together, there is no possibility of a break in the longitudinal direction of the fibers so that a clear image can be transmitted and the fibers can manifest a satisfactory heat resistance and mechanical strength as a whole.

These objects and other objects, features, aspects and advantages of the present invention will become more apparent from the following detailed description of the present invention when taken in conjunction with the accompanying drawings.

DESCRIPTION OF PREFERRED EXAMPLE EMBODIMENTS AND OF THE BEST MODE OF THE INVENTION

Figure 1:
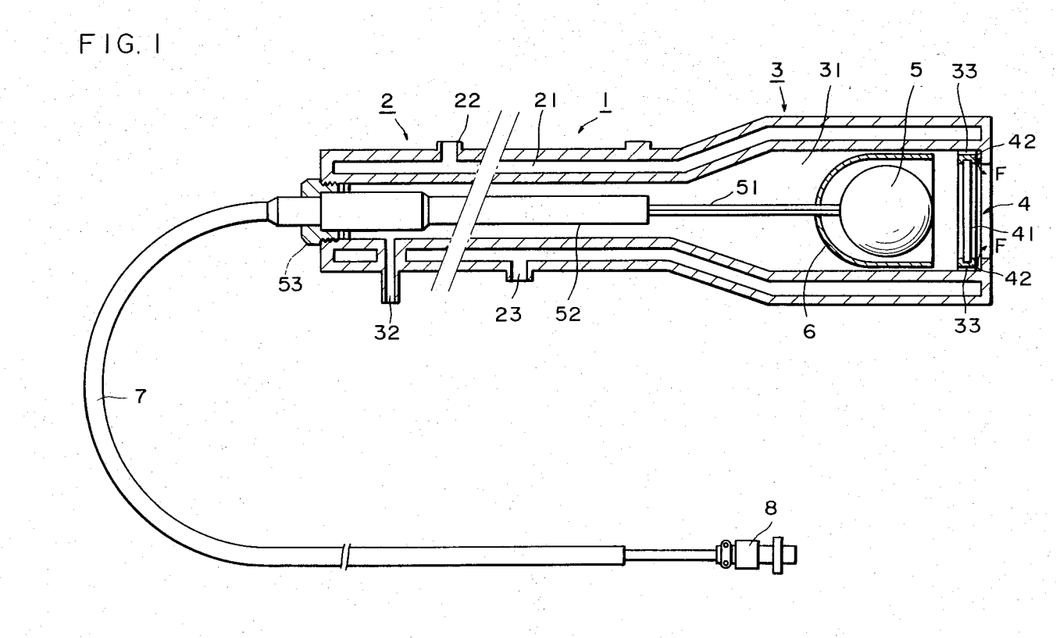
FIG. 1 is a partially fragmentary view of an embodiment of the present invention.

Referring to FIG. 1, a metal-made protective casing 1 includes a cooling conduit 2, a receiving section 3 formed into a relatively large cross section at a tip portion of the cooling conduit 2 and a lighting window 4. The cooling conduit 2 and the receiving section 3 are made in the form of an integral unit of heat-proof metal such as stainless steel or titanium, if necessary, having a coating of heat-proof heat insulating material covering its outer surface. A silica glass 41 is fitted into the lighting window 4.

The cooling conduit 2 comprises a cooling path 21 for leading such a cooling medium as water to the receiving section 3, a cooling water supply inlet 22 for feeding the cooling water into the device and a cooling water drain outlet 23 for discharging the cooling water. When the cooling water is fed via the cooling water supply inlet 22, the cooling path 21 is filled with the cooling water so that the cooling water is circulated and discharged from the drain outlet 23 after cooling the receiving section 3. The metal-made protective casing 1 is further provided with a gas inlet port 32 through which compressed air, non-inflammable gas or low temperature gas serving also as a further cooling medium for the casing 1 is introduced. There is mounted at the periphery of the silica glass 41 in the lighting window 4 a glass fixing frame 42 typically of heat-proof metal or ceramic having openings 33 at several points at its periphery. With such an arrangement, the air or other gas introduced via the inlet port 32 is blown out toward the outer surface of the viewing window 4 (as shown by the arrow F) so that the external surface is clear of dust or other foreign substances.

Disposed within a space 31 of the receiving section 3 are a light source 5 such as a 300 W tungsten halogen lamp and a reflective mirror 6 covering the cooling conduit side 2 of the lamp 5. The lamp 5 is to lighten a surface of a wall in a high temperature furnace sought to be observed through the viewing window 4. A power supply cable 51 for the lamp 5 extends outwardly of the device via a support pipe 52 typically of metal or synthetic resin and a nut 53. The externally extending power supply cable 51 is covered with a flexible metal protection tube 7 with its one end thereof connected to a connector 8 for power supply.

When the connector 8 is plugged into a power source, the lamp 5 will floodlight directly the wall surface of the furnace at an extremely high intensity of illumination. As a result, the state of the wall surface of the furnace may be visually inspected by means of a TV camera or other measures.

Figure 2:
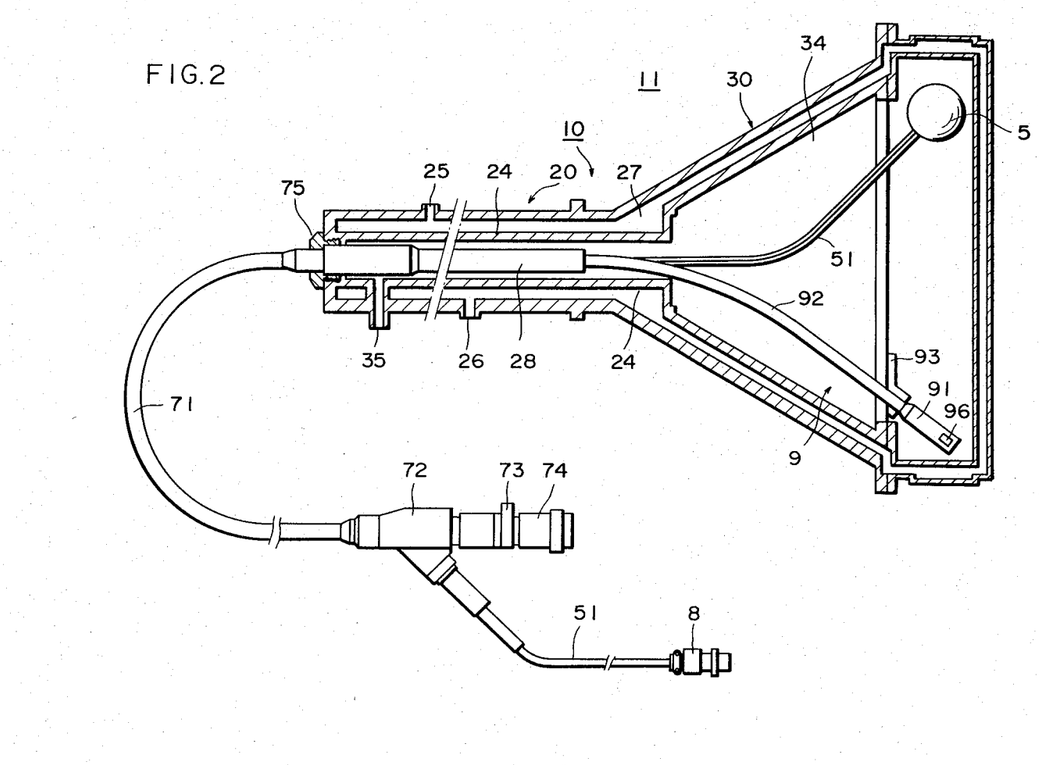
FIG. 2 is a partially fragmentary view of another embodiment of the present invention.

In the alternative embodiment of FIG. 2, the lamp 5 and an inspection device 9 comprising an objective section 91 and an optical fiber bundle or cable 92 are housed in the metal-made protective casing 10 of a high temperature resistant lighting device 11 for simultaneously illuminating and observing the wall surface of the high temperature furnace to monitor the state of the wall surface. As with the high temperature resistant lighting device as shown in FIG. 1, the metal-made protective casing 10 contains a cooling conduit 20 and a receiving section 30. Though not shown in the drawings, a viewing window (not shown) is formed at a side of the casing. A water flow guide wall 24 is provided to define a cooling path 27 by which cooling water is led to the receiving section 30. There are further provided a cooling water supply inlet 25 for supply of the cooling water and a cooling water drain outlet 26 for discharge of the cooling water. The receiving section 30 has a sector-shaped configuration disposed at a tip portion of the cooling conduit 20 and having a space 34 for accommodating the lamp 5 and the inspection device 9 therein.

Figure 3:
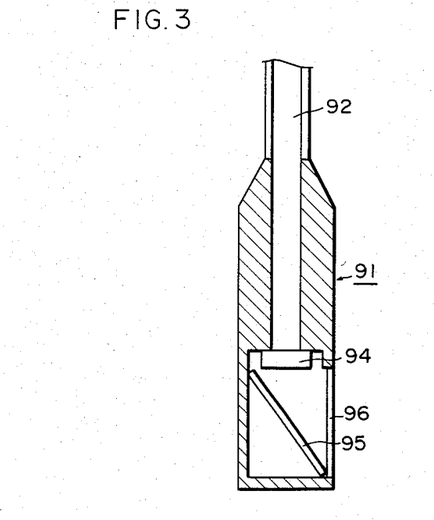
FIG. 3 shows a sectional view through an objective section as shown in FIG. 2.

The inspection device 9 comprises an objective section 91 and a bundle 92 of optical fibers for image transmission. The optical fiber bundle 92 may be inserted into a suitable heat-proof metallic tube. Disposed at a tip portion of the optical fiber bundle 92 are an objective lens 94, a reflective mirror 95 and an open viewing window 96. The purpose of the reflective mirror 95 is to lead toward the optical fiber bundle 92 an image of the wall surface of the furnace projected through the viewing window 96.

The optical fiber bundle 92 used with the present invention may comprise a substantial number of runs (e.g., about 3,000 runs to 150,000 runs) of multiple-component glass fiber or typically optical silica glass fibers with an outer diameter of about 5 μm to 50 μm. A profile of a single run of the optical fibers comprises a core section for conducting light and a cover layer at the periphery of the core section. The cover layer is made of a glass material whose refractive index is smaller than that of the core section. If necessary, the cover layer itself is covered by a protection layer. The bundle of silica glass fibers is more desirable from a heat-proof point of view as the optical fiber bundle used for the present invention. Although it is basically possible to employ the bundle in the form of individual runs or an integral unit of runs molten together, the integral and bonded form of the bundle is free from any break during use and more effective in transferring a clear image of the object being viewed. In addition, the latter is preferable due to its better heat resistance and mechanical strength.

Figure 4:
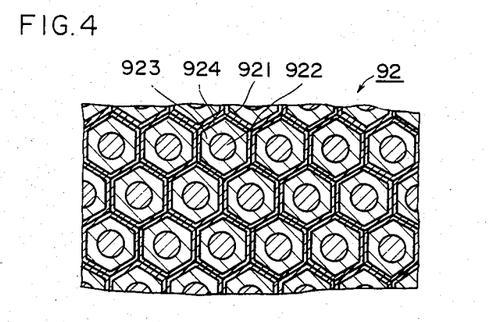
FIG. 4 is a cross sectional view of an array of runs of optical fibers of silica glass as shown in FIG. 2.

FIG. 4 shows on an enlarged scale a partially fragmental view of an array of the bundle of runs of the silica glass fiber bonded together to form the light conductor cable 92. More specifically, each run of an optical fiber 921 illustrated herein comprises a core section 922 of pure silica glass for the image transfer, a cover layer 923 disposed around the periphery of the core section 922 and a protection layer 924 formed around the periphery of the cover layer 923 which is made of pure silica glass doped with a suitable dopant to lower the refractive index of the cover layer 923 as compared with that of the pure silica glass of the core 922. That is, the refractive index is made adjustable to enable only the core 922 to convey light, by varying the dosing amount of the dopant. The protection layer 924 is made of pure silica glass. Provision of the protection layer 924 is desirable in order to protect the core 922 and the cover layer 923 against damage or misalignment in melting the respective runs of fibers into a bundle. One way to manufacture the bundle or cable 92 of optical fibers is to prepare a total of about 3,000 to 150,000 runs of optical fibers 921 each run comprising the core 922, the cover layer 923 and the protection layer 924, insert these runs of the optical fibers into a silica glass tube, wire draw these runs of the optical fibers under a high temperature condition and bond the protection layers 924 of adjacent ones of the runs of the optical fibers to one another after dimension reduction.

Figure 5:
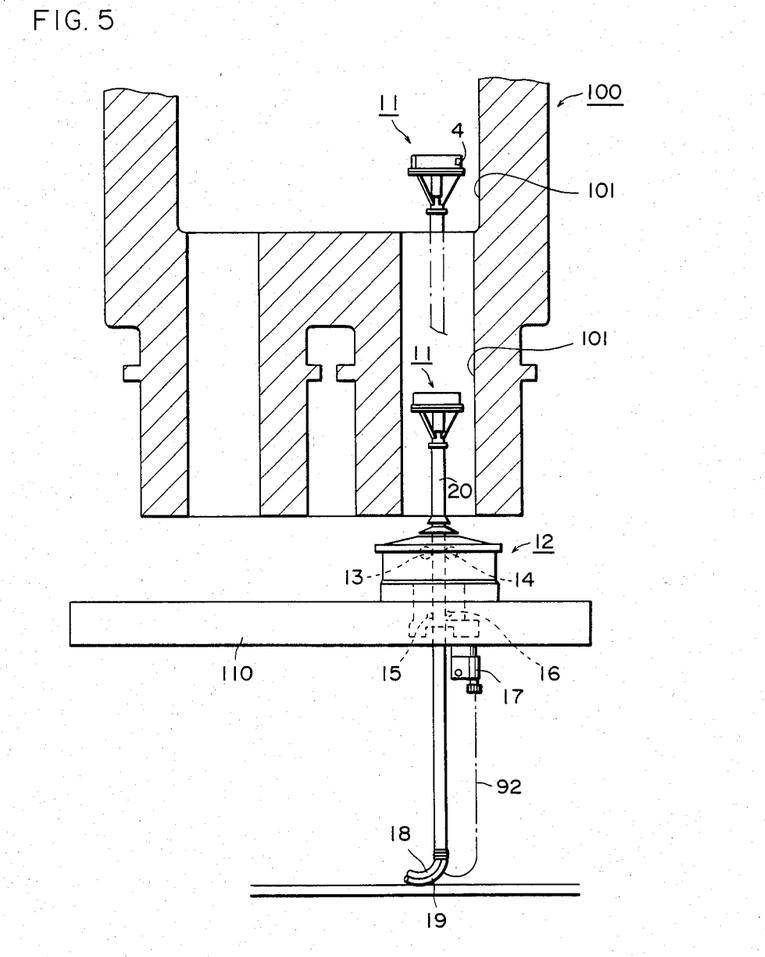
FIG. 5 is a cross sectional view of principal components under the condition where a wall surface of a high temperature furnace is being monitored with the high temperature resistant lighting device as shown in FIG. 2.

The power supply cable 51 leading to the lamp 5 and the bundle or cable 92 of the optical fiber are led into the cooling conduit 20 to combine into a single unit within a support member 28 and finally let out of the device through a nut 75. The power supply cable 51 and the bundle or cable 92 of the optical fibers are covered together with a flexible metal protection tube 71 having at its opposite end a branch section 72 for separating optical fiber of the bundle 92 from the power supply cable 51. It is noted that the remaining end of the bundle or cable 92 of the optical fiber carries a filter 73 and a lens system 74. The filter 73 is typically a color filter widely used for optical systems. The lens system 74 is connected to a TV camera 17 as depicted in FIG. 5. The remaining end of the power supply cable 51 is connected to the connector 8.

FIG. 5 shows partially in cross section, a typical way to inspect the wall surface of a high temperature furnace using the inspection device as shown in FIG. 2. In FIG. 5, a table 110 is operatively associated with a drive assembly 12 for moving the high temperature resistant inspection device 11 in a vertical direction and for rotating the cooling conduit 20. The drive assembly 12 contains a predetermined number of rollers 13 to 16. The cooling conduit 20 is sandwiched between two pairs of rollers 13 and 14 and 15 and 16. When motors, not shown, are driven, these rollers 13 to 16 raise and lower and rotate the high temperature resistant inspection device 11 within the high temperature furnace 100. The lowest end of the cooling conduit 2 is connected to a cooling water supply tube 18 and a cooling water drain tube 19. It is understood that the cooling water supply tube is connected with the cooling water supply inlet 25 in FIG. 2 and the cooling water drain tube is connected with the cooling water drain outlet 26. As mentioned above, the other end of the bundle 92 or cable of the glass fibers is led to the TV camera 17. The connector 8 of the power supply cable 51 as depicted in FIG. 2 is connected to a power source, not shown.

With the above arrangement, the lamp 5 in the high temperature resistant lighting device 11 floodlights directly the wall surface 101 of the high temperature furnace 100 up to a very high brightness through the viewing window 4. Light reflected from the wall surface of the furnace is focused into an image at the end of the glass fiber bundle or cable 92 through the viewing window 4 and the objective section 91 held in place by a mounting member 93. This image is led to the TV camera 17 through the glass fiber bundle or cable 92, a filter 73 and the lens system 74. The TV camera 17 provides a video image representative of the state of the wall surface 101. Cooling water supplied through the tube 18 runs through the cooling water path 27 and moves out of the cooling water drain tube 19 so that the high temperature resistant lighting device 11 is cooled as a whole so as not to thermally damage the lamp 5 and the inspection device 9 which are exposed to a high temperature environment in the furnace 100 above 1000° C., for example. It is possible to observe uniformly the state of the wall surface by raising and lowering and rotating the high temperature resistant lighting device 11.

Figure 6:
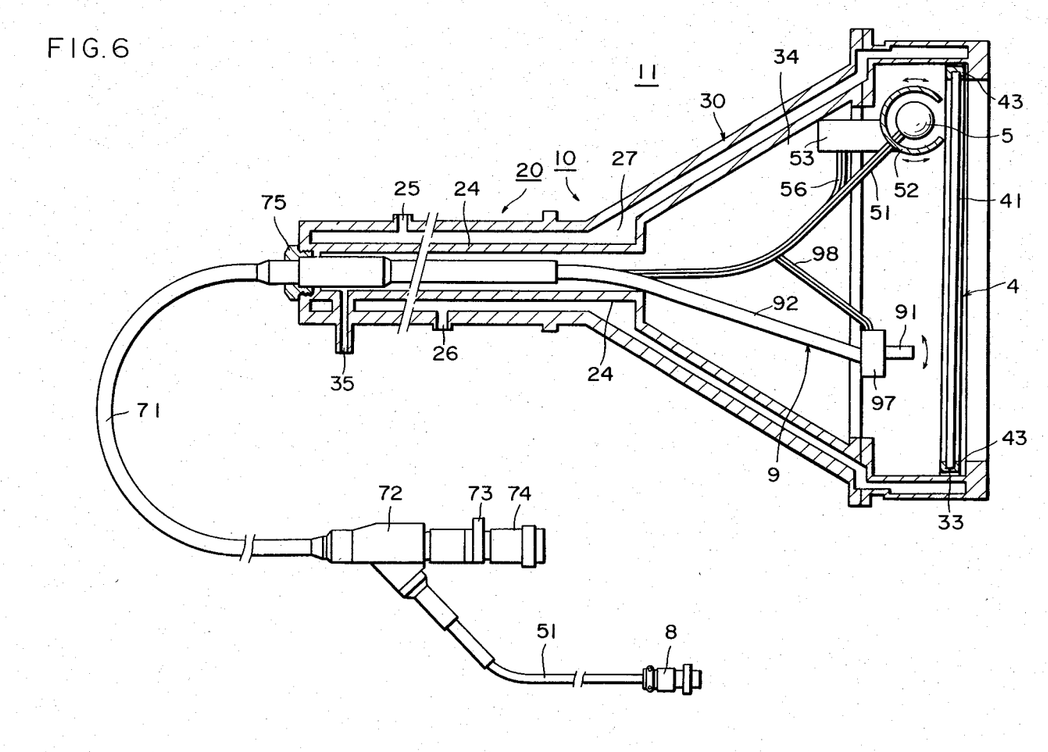
FIG. 6 is a partially fragmentary view of still another embodiment of the present invention.
Figure 7:
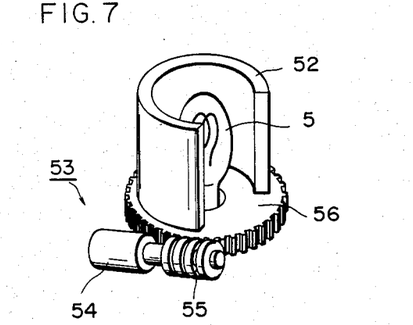
FIG. 7 is a perspective view of principal components illustrating a drive assembly for a light source as shown in FIG. 6.

The embodiment of FIG. 6 is similar to that of FIG. 2 except for the following differences. In other words, the viewing window 4 is formed at the front end of the receiving section 30. A silica glass 41 is attached to the viewing window 4 and surrounded by gas ejection openings 33. The reflective mirror 52 for the lamp 5 is rotatable with the drive assembly 53. In particular, as best shown in FIG. 7, the reflective mirror 52 is cylindrically shaped with a cutout in the lighting direction of the lamp 5. The reflective mirror 52 is coupled to a gear 56. The gear 56 is in engagement with a worm gear 55 coupled directly with a motor 54. Upon rotating the motor 54 the gear 56 rotates by way of the worm gear 55 so that the reflective mirror 52 rotates in the direction of the arrow in FIG. 6 in such a manner as to vary the lighting direction of the lamp 5.

The objective section 91 is likewise made rotatable with a drive assembly 97 as discussed below. Control cables 56 and 98 for the respective drive assemblies 53 and 97 are led outside of the device together with the power supply cable 51 for the lamp 5 for connection to the connector 8. The reflective mirror 52 and the objective section 91 are constructed to be rotatable so that the lighting direction of the lamp 5 may be variable with respect to the viewing direction of the objective section 91. Since a flaw or an uneven surface in the wall surface of the furnace causes a variation in shade, an image including such shade may be picked up by means of the TV camera 17 (FIG. 5) of the inspection device 9. Even though the distance between the wall surface of the furnace and the viewing object varies, it is possible to observe accurately and scrupulously any flaw or uneveness or shape in the wall surface of the furnace.

Figure 8:
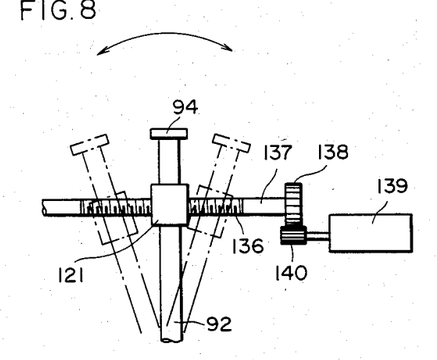
FIG. 8 is an illustration of principal components of another example of a drive assembly for rotating the objective section.
Figure 9:
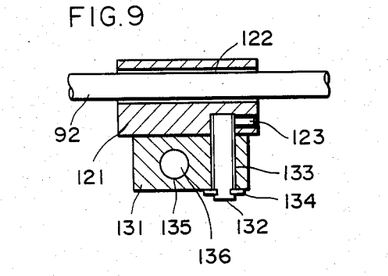
FIG. 9 is a longitudinal cross sectional view a drive member as shown in FIG. 8.

The embodiment of the drive assembly as shown in FIGS. 8 and 9 is adapted so that only the lens 94 is mounted at the tip portion of the glass fiber bundle or cable 92 without using the reflective mirror 95 as depicted in FIG. 3 and one end of the glass fiber bundle or cable 92 is rotatable within the space 34 in a direction crossing the viewing window 4. The glass fiber bundle 92 is secured in the fixture 121. The drive member 121 has a through-hole 122 in which the glass fiber bundle or cable 92 is held to be movable. A block 131 is disposed beneath the drive member 121 such that the block 131 and the fixture 121 are freely rotatable independently of each other. In other words, the block 131 is made rotatable with respect to a pin 132 by forming a hole 133 in the block 131 for the pin 132, inserting one end of the pin 132 into the drive member 121 and fixing the pin 132 to the fixture 121 by means of a set screw 123. A ring 134 is affixed around the other end of the pin 132. The block 131 is further provided with a threaded hole 135 in a direction normal to the through-hole 122. A drive spindle 137 having a threaded portion 136 is inserted into the threaded hole 135. A gear 138 is attached to one end of the drive spindle 137. The gear 138 engages with a gear 140 coupled directly with a motor 139. When the drive shaft of the motor 139 rotates the spindle 137 through the gear 140 and the gear 138 the drive member 121 and with it the glass fiber bundle or cable 92, is rotated in the direction of the arrow in FIG. 8 while the threaded portion 136 of the spindle 137 is in engagement with the threaded hole 135 in the block 131.

Figure 10:
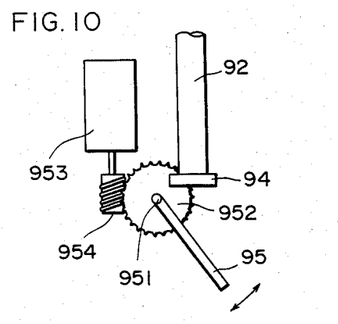
FIG. 10 is an illustration of another example of a drive assembly for rotating the objective section.

FIG. 10 illustrates another example of an assembly for rotating the reflective mirror 95 included in the objective section 91 as seen in FIG. 3. One end of the reflective mirror 95 is secured on a rotation shaft 951 to which a spur gear 952 is coaxially affixed. This spur gear 952 meshes with a worm gear 954 directly connected to a drive shaft of a motor 953. Therefore, rotation of the drive shaft of the motor 953 causes rotation of the reflective mirror 95 in the direction of the arrow in FIG. 10.

While both the reflective mirror 52 for the lamp 5 and the objective section 91 are rotatable in the above illustrated embodiments, it will be appreciated by those skilled in the art that the present invention shall not be limited thereto and only one of the two components may be rotatable.

Although the present invention has been described and illustrated in detail, it is to be clearly understood that the same is by way of illustration and example only and is not to be taken by way of limitation, the spirit and scope of the present invention being limited only by the terms of the appended claims.

We claim:

1. A high temperature resistant lighting device for monitoring a high temperature environment, comprising: a metallic heat protective casing including a space section formed therein and a window made of a heat protective glass member disposed along a wall thereof, said casing further having a cooling path defined along a wall in said space section, except in said window, for circulation of a cooling medium; light source means housed in said space section of said metallic heat protective casing for lighting an object to be observed through said window in said high temperature environment, a bundle of optical fibers forming a light conductor cable leading into said heat protective casing, objective means secured in a position in said heat protective casing for picking up light reflected by said object through said window and for introducing the reflected, picked-up light into a tip portion of said light conductor cable, and means leading said light conductor cable outside said heat protective casing for observing said object inside said high temperature environment by an observer outside said high temperature environment.

2. The high temperature resistant lighting device of claim 1, further comprising: rotating means for rotating at least one of said light source means and said objective means for varying the direction of viewing toward said object through said window.

3. The high temperature resistant lighting device of claim 2, wherein said objective means includes a reflective mirror for directing light from said object toward a tip portion of said bundle of optical fibers forming said light conductor cable.

4. The high temperature resistant lighting device of claim 3, wherein said rotating means includes means for rotating said reflective mirror.

5. The high temperature resistant lighting device of claim 2, further comprising: a reflective mirror arranged for cooperation with said light source means; and wherein said rotating means includes means for rotating said reflective mirror for said light source means.

6. The high temperature resistant lighting device of claim 1, wherein said metallic heat protective casing includes: gas feed inlet means for feeding pressurized gas into said space section; and gas discharge outlet means disposed in the neighborhood of said window for discharging gas fed into said space section over said window for keeping the window clean.

7. The high temperature resistant lighting device of claim 1, wherein said metallic heat protective casing includes a cylindrical section open to said space section, said light source means including a power supply cable; and wherein said means for leading said light conductor cable outside said heat protective casing are located in said cylindrical section and include a sleeve at its edge portion for leading said power supply cable and the remaining end of said light conductor cable outwardly of said device.

8. The high temperature resistant lighting device of claim 7, further comprising: imaging means disposed at the remaining end of said light conductor cable for imaging light reflected by said object.

9. The high temperature resistant lighting device of claim 1, wherein said optical fibers in the bundle forming said light conductor cable is made of silica glass.

10. The high temperature resistant lighting device of claim 9, wherein said bundle of optical fibers forming said light conductor cable comprises multiple runs of silica glass fibers molten together into a single unit, wherein each run of said silica glass fibers includes: a core section made of pure quartz glass; a cover layer made predominantly of pure silica glass; and a protective layer covering the periphery of said cover layer.

* * * * *

UNITED STATES PATENT AND TRADEMARK OFFICE
CERTIFICATE OF CORRECTION

PATENT NO. : 4,509,104

DATED : April 2, 1985

INVENTOR(S) : Koichi Suzuki, Seiroku Oose, Yasutaka Hirao

It is certified that error appears in the above—identified patent and that said Letters Patent is hereby corrected as shown below:

--[73] Assignee:  Dainichi-Nippon Cables, Ltd.;
Amagasaki, Japan and

Kurosaki Refractories Co., Ltd.;
Kitakyushu, Japan--

Signed and Sealed this

Nineteenth Day of November 1985

[SEAL]

Attest:

DONALD J. QUIGG

Attesting Officer

Commissioner of Patents and Trademarks